F. MÜLLER.
METHOD OF MAKING THREAD MILLING HOBS.
APPLICATION FILED FEB. 1, 1919.

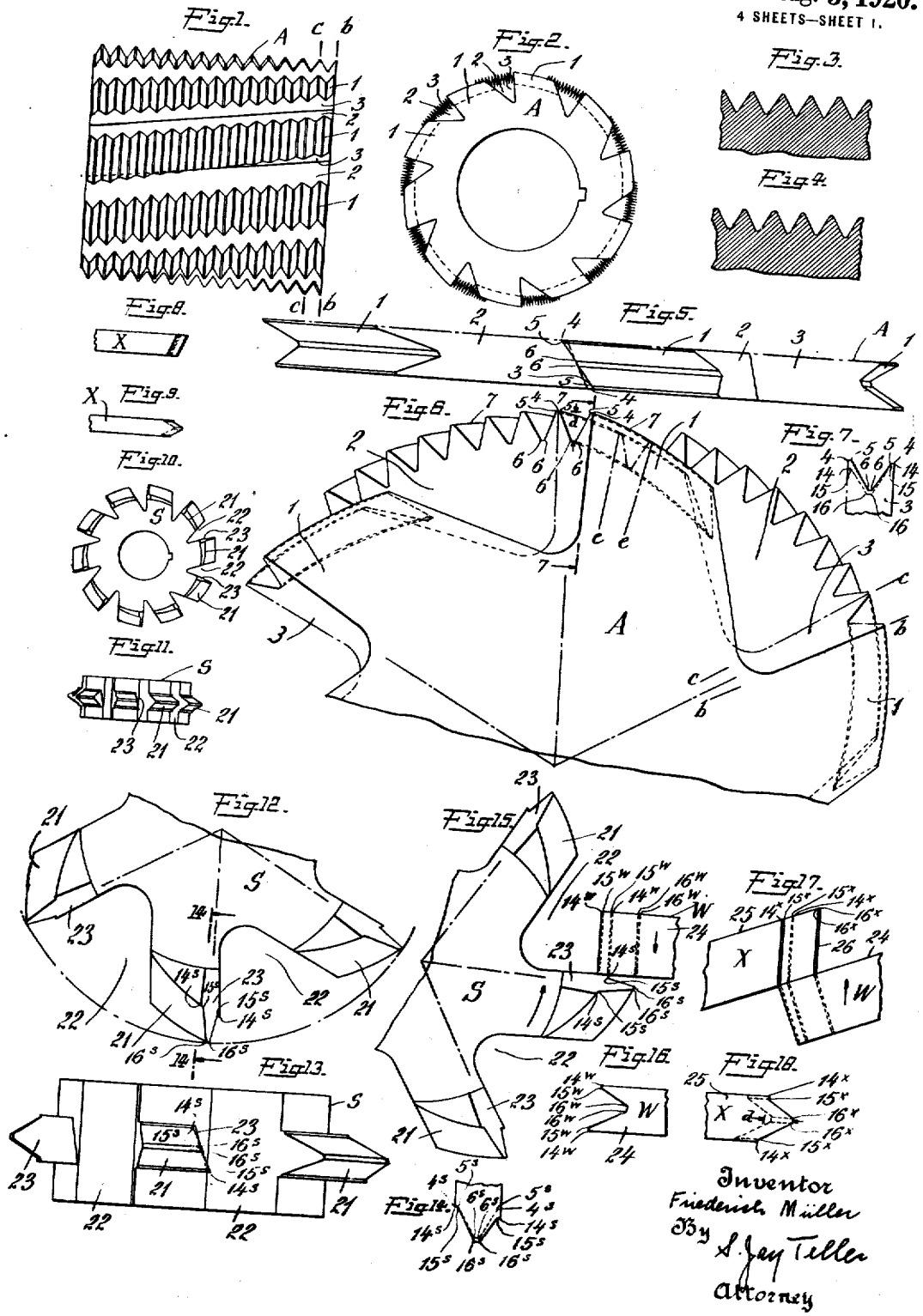

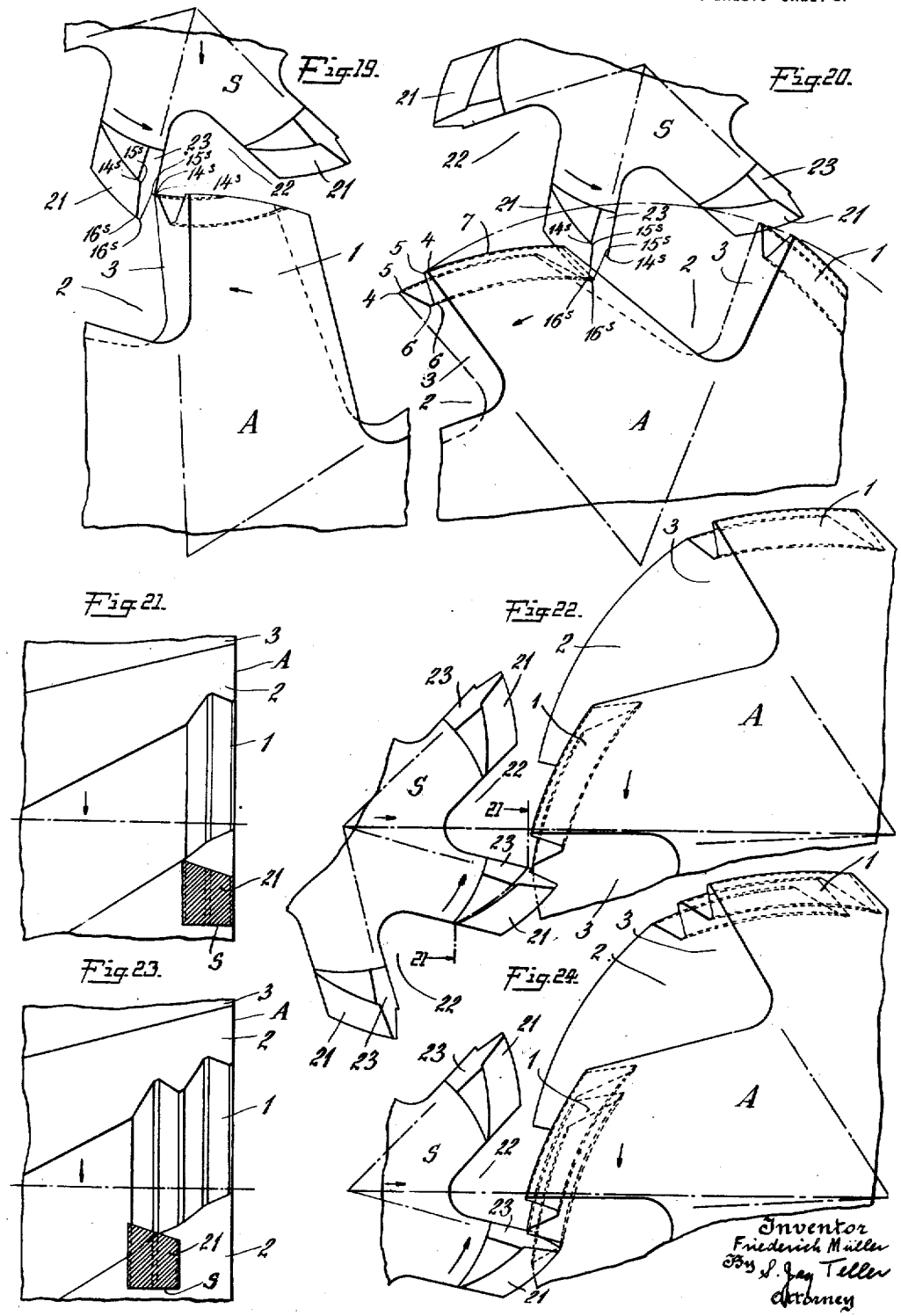

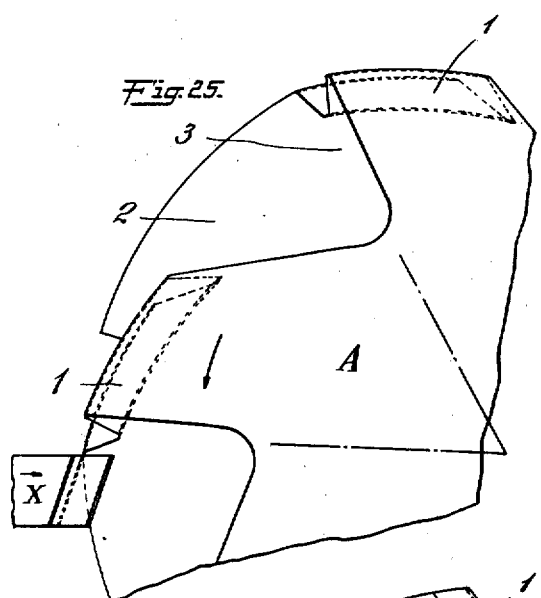
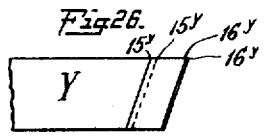
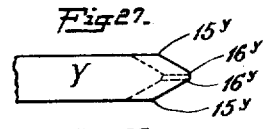
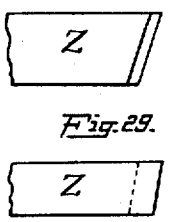
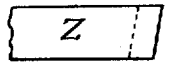
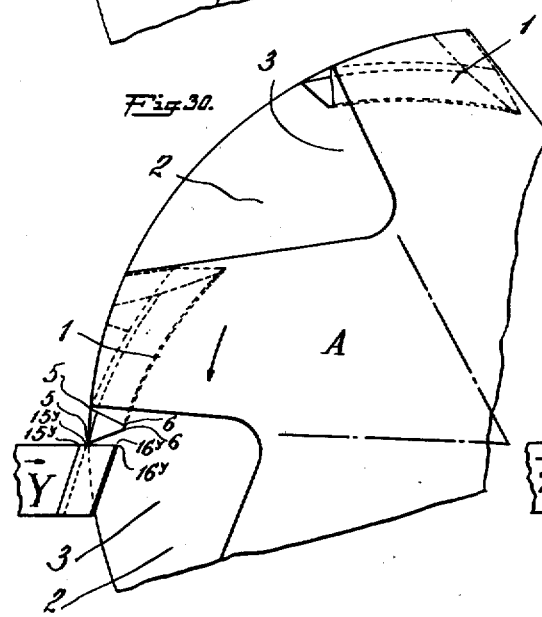
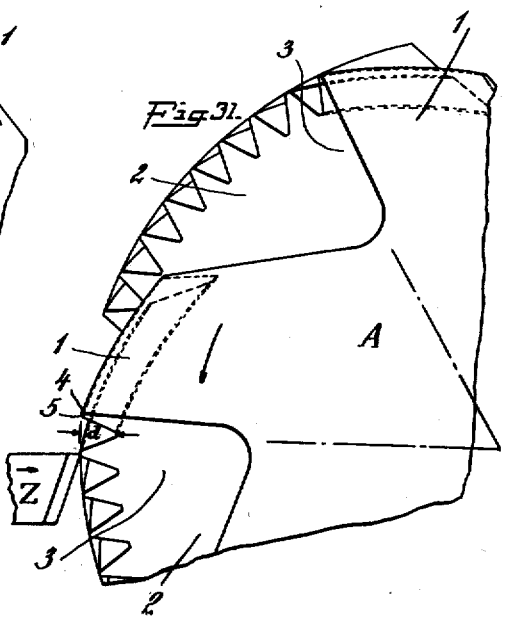

1,348,306.

Patented Aug. 3, 1920.
4 SHEETS—SHEET 4.

Inventor
Friederich Müller
By S. Jay Teller
Attorney

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING THREAD-MILLING HOBS.

1,348,306.     Specification of Letters Patent.     Patented Aug. 3, 1920.

Application filed February 1, 1919. Serial No. 274,531.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Thread-Milling Hobs, of which the following is a specification.

The invention relates to a method of making milling cutters which are adapted to cut a series of uniformly spaced similar grooves. The best example of a cutter of this type is a hob such as is used for milling threads, the threads being completely cut during a single revolution of the part being threaded. A milling cutter or hob such as that referred to is adapted to cut a composite contour which consists of a number of equal elemental contours arranged at uniform distances. I will herein refer to cutters adapted to be made in accordance with the invention as thread milling hobs but it will be understood that the invention in its broader aspects is not so limited.

A hob adapted to be made in accordance with the present invention is in many respects similar to the milling cutter set forth in my copending application for milling cutters, Serial No. 268,349, filed December 26th, 1918. The hob itself is set forth in my copending application Serial No. 274,529, filed on even date herewith. As pointed out in the said applications, it is advantageous to provide milling cutters for cutting edges which are inclined with respect to the cutter axis so as to enable each of the successive teeth to engage the work gradually and to effect a shearing cut. This inclination of the cutting edges is important not only for cutters which are of uniform diameter throughout or which have a uniform taper, but also for formed or contour cutters in which the diameter varies from end to end in ways differing from a uniform taper, such cutters being those adapted to cut a predetermined contour other than a straight line.

The inclination of the cutting edges is particularly important in the case of thread milling hobs which are frequently of considerable length and which have a large number of thread cutting points at equal distances from the cutter axis. According to prior practice, thread milling hobs have been made with their cutting faces parallel with the axis; that is, with the cutting points of each row so arranged that they all engage the work at the same time, thus causing much shock and vibration. To reduce the shock and vibration as much as possible the hobs have been run at a slow speed, but even at the slow speed the hobs have worn rapidly and there has been a marked tendency toward rough and uneven cutting.

In accordance with the invention set forth in my said application, Serial No. 274,529, I have provided a hob having the cutting faces inclined with respect to the axis so that the cutting points of each row engage the work successively, the cutting action beginning at one end and being transferred from tooth to tooth in succession until the other end is reached. This form of hob practically eliminates shock and vibration and enables me to greatly increase the speed of cutting. In addition, I find that because of the absence of shock the wear on the hob is greatly reduced and the work is given a much smoother finish than was heretofore possible.

The principal object of the invention is to provide a method of making a milling cutter or thread milling hob which is adapted to accurately cut a predetermined composite contour such as a thread contour and which has its cutting edges longitudinally inclined with respect to the cutter axis for the purpose set forth and which is properly relieved. The method is in part similar to that presented in my copending application for methods of making milling cutters, Serial No. 274,530, filed on even date herewith. As to some of its features, the present method can be considered as a variation or as a special form of the method set forth in the said application.

In order that my novel method may be clearly understood, I have shown in the accompanying drawings a thread milling hob embodying the invention set forth in the aforesaid application Serial No. 274,529, and I have illustrated several ways in which the method may be practised. It will be understood, however, that the drawings are for illustrative purposes only and are not to be construed as defining or limiting the scope of the invention, the accompanying claims being relied upon for that purpose.

Of the drawings:

Figures 1 and 2 are side and end views respectively of a thread milling hob such as may be made in accordance with the invention.

Figs. 3 and 4 are diagrammatic views illustrating different forms of threads.

Figure 32:
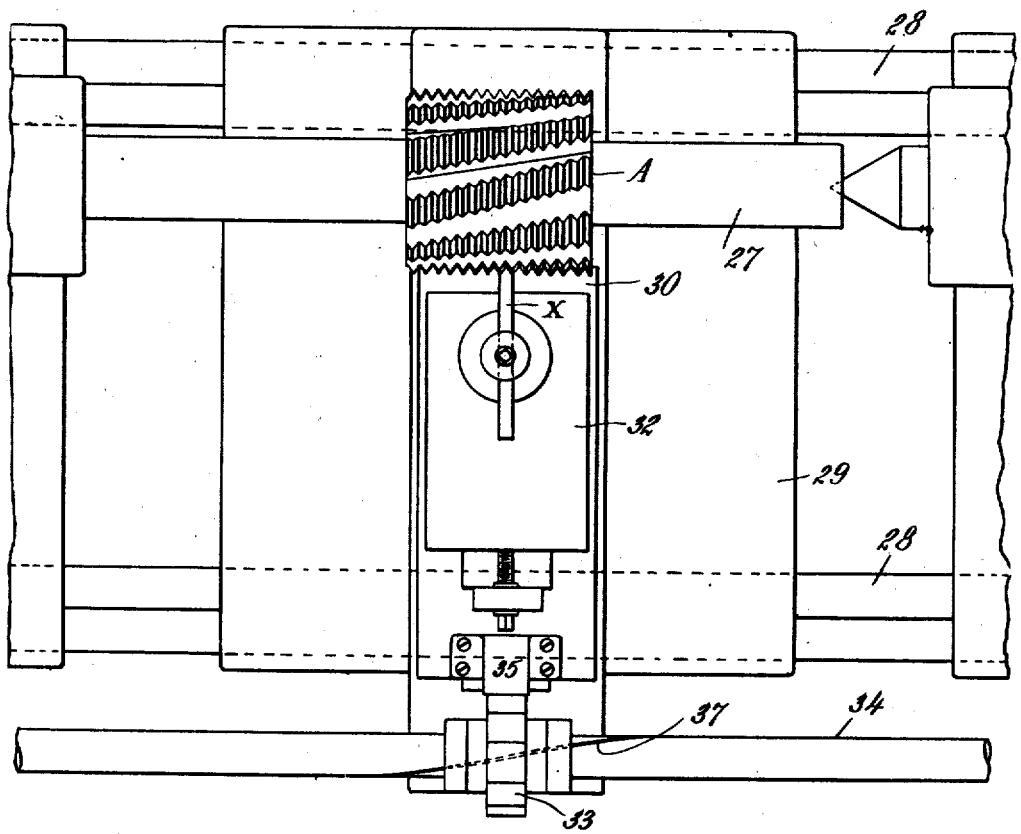

Figs. 5 and 6 are enlarged diagrammatic plan and end views respectively of the hob. In these views there is shown a smaller number of teeth and the inclination of the cutting faces and the relief are considerably increased in order to bring out the principles of the invention more clearly. Fig. 6 shows the entire length of the hob, whereas Fig. 5 shows a section thereof between the lines b—b and c—c of Figs. 1 and 6.

Fig. 7 is a diagrammatic view illustrating certain features of the hob section shown in Figs. 5 and 6.

Figs. 8 and 9 are side and plan views respectively of a lathe tool which may be used for cutting the hob.

Figs. 10 and 11 are end and bottom views respectively of a milling cutter which may be used either for making the lathe tool or for roughing out the hob.

Figs. 12 and 13 are enlarged diagrammatic end and bottom views respectively of the preliminary cutter shown in Figs. 10 and 11. The cutter is shown as having a smaller number of teeth and as having increased inclination and relief in conformity with the increased inclination and relief shown in Figs. 5 and 6.

Fig. 14 is a diagrammatic view illustrating certain features of the preliminary cutter shown in Figs. 12 and 13.

Figs. 15 and 16 are enlarged side and plan views respectively of an intermediate tool which may be used for making the lathe tool shown in Figs. 8 and 9.

Fig. 15 illustrates the milling cutter shown in Figs. 12 and 13 in operative relation to the tool.

Fig. 17 illustrates the intermediate tool shown in Figs. 15 and 16 in use for making the lathe tool.

Fig. 18 is a plan view of the lathe tool on the same scale as Fig. 17.

Fig. 19 is a diagrammatic view illustrating the preliminary milling cutter in use for milling a section of a blank for the hob, the milling operation having been started but not finished.

Fig. 20 is a view similar to Fig. 19 but showing the section of the blank completely milled.

Fig. 21 is a diagrammatic fragmentary front view of a blank which is being milled. In this view one tooth of the preliminary milling cutter is shown in section along the line 21—21 of Fig. 22.

Fig. 22 is a diagrammatic fragmentary end view showing the preliminary milling cutter in operative relation with the blank, as illustrated in Fig. 21.

Fig. 23 is a view similar to Fig. 21 but showing the preliminary milling cutter and the blank in different relative positions.

Fig. 24 is a view similar to Fig. 22 but showing the preliminary milling cutter in the position illustrated in Fig. 23.

Fig. 25 is a view showing the lathe tool in use for cutting the blank.

Figs. 26 and 27 are side and plan views respectively of a different lathe tool which may be used.

Figs. 28 and 29 are side and plan views respectively of a lathe tool adapted to be used as a companion for that shown in Figs. 26 and 27.

Fig. 30 is a view similar to Fig. 25 but illustrating the lathe tool shown in Figs. 26 and 27.

Fig. 31 is a view similar to Fig. 30 but illustrating the lathe tool shown in Figs. 28 and 29.

Fig. 32 is a diagrammatic plan view of a machine adapted for carrying out the method.

Figure 33:
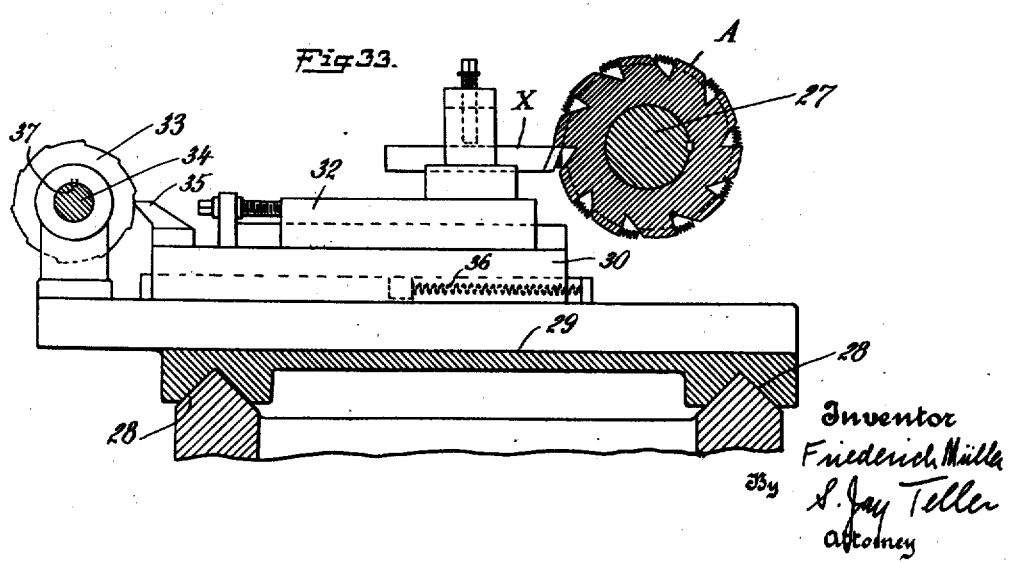

Fig. 33 is a cross sectional view of the machine illustrated in Fig. 32.

In order that the method involving the invention may be clearly understood, I will first describe a hob such as may be made in accordance therewith.

Referring to the drawings, particularly to Figs. 1 to 7 thereof, A represents a thread milling hob embodying the invention set forth in my said application Serial No. 274,529. Such a hob may be made for cutting threads of any standard form and in Figs. 3 and 4 I have illustrated U. S. standard threads and Whitworth threads. For the sake of convenience and simplicity I have illustrated only U. S. standard threads in Figs. 1 and 2 and in the other figures, but it will be understood that there is no limitation of the invention on this account and that the thread contour may consist of straight lines or curves. Preferably in accordance with the standard thread forms each thread is symmetrical in outline as is also each groove between two threads.

The hob is provided with a plurality of generally longitudinal teeth 1 between which are grooves 2, the teeth and grooves being preferably spaced uniformly. The grooves 2 can be of any usual or preferred depth and shape, as required. The front wall 3 of each tooth constitutes a cutting face and this cutting face is radial or approximately so in order to provide a satisfactory cutting angle. Each tooth 1 is provided with a series of circumferentially extending ridges or tongues having grooves formed between them. The tongues with the grooves between them are so shaped and spaced as to correspond to the form and pitch of the threads to be cut. Preferably, as illustrated, the ridges or grooves of the several teeth are in circumferential register so as to follow the same paths when the hob is rotated.

In accordance with the invention, each cutting face 3 is inclined or positioned obliquely so that its longitudinal lines lie at angles to the axis of the cutter. Preferably, as shown, the entire teeth 1 are oblique or inclined and not merely the front cutting faces 3 thereof. Preferably each tooth 1 is generally helical in form, and each cutting face 3 conforms to a helicoid. As illustrated in Figs. 1, 2, 5 and 6, the helicoid is one formed by a generatrix following the axis of the cutter and also following a helix on a cylinder concentric with the axis thereof. The character of the helicoid may, however, be varied. The teeth and the cutting faces may be inclined in either direction and the degree of inclination may be varied as required.

Figs. 5 and 6 show the hob diagrammatically on enlarged scale. Fig. 5 includes only a section of the hob extending from the line $b-b$ to the line $c-c$ as indicated in Figs. 1 and 6. It will be obvious that the complete hob comprises a series of sections such as that shown in Fig. 5 the respective inclined cutting faces of all of the sections joining and constituting continuous unitary cutting faces, as shown in Figs. 1, 2 and 6. The section presents a contour which is one of the number of equal elemental contours of which the composite contour of the hob consists.

As before stated, the tongues, and the grooves between them correspond in form and spacing to the form and pitch of the threads to be cut. For the form of threads shown the tops of the tongues are provided with "flats," the bottoms of the grooves are provided with other "flats," and inclined surfaces are provided connecting the respective flats. Each elemental contour includes points 4, 5, 6, 6, 5 and 4, the depth of the contour being $d$. At the cutting faces 3 the outer flats 5—4—5 are all at the same distance from the axis, and in fact, all points along each flat are at the same distance from the axis. Similarly, the bottom flats 6—6 are all at the same distance from the axis, and all points along each flat are at the same distance from the axis. Similarly, each inclined line 5—6 connecting the flats is correctly positioned. In fact, the entire effective contour of each cutting face from one end of the hob to the other, is such that, when the hob is rotated, it will define the correct thread contour, one element of this contour being shown by full lines in Fig. 7. This correct effective contour obtains notwithstanding the fact that the cutting face is a warped or helicoidal surface.

Each tooth of the hob is relieved along lines 7 extending backward and inward from the cutting face in planes perpendicular to the hob axis. These relief lines form continuous surfaces which extend from end to end of the hob and which are properly constructed notwithstanding the variations in radius at different points along the thread outline and notwithstanding the variations in angular position resulting from the warped or helicoidal cutting face. The relief lines 7 are maintained in similar relationship to each other as they extend backward and inward, the lines preferably conforming to spirals of Archimedes in the said planes perpendicular to the axis. The result is that each tooth of the hob at any axial plane of intersection such as 7—7 has a distorted shape, as shown by dotted lines in Fig. 7. This distorted shape includes points 14, 15, 16, 16, 15 and 14 corresponding respectively to the points 4, 5, 6, 6, 5 and 4 of the outline of the cutting face. The distortion of shape results from the fact that the successive inward inclined relief lines 7 start at different angular positions because of the inclined or helicoidal cutting face. Therefore with the cutting face inclined in the direction illustrated the several points 15, 16, 16, 15 and 14 to the left of the point 4 or 14 are spaced inward from the respective points 5, 6, 6, 5 and 4 by progressively increasing distances. Notwithstanding this distortion in shape at an axial plane of intersection, the outline or effective contour at the cutting face is correct, as before stated.

The effective contour at the cutting face is correct, as stated, and this correct effective contour is maintained when the cutting faces 3 are ground backward. In order for this to be true, it is obviously necessary for the hob teeth to present the same shape at successive surfaces of intersection, the said surfaces being similar in form and position to the initial cutting faces 3. At any surface, such as $e-e$, back of an initial cutting face 3 and similar to the said face, the same effective contour will be found. Therefore if the teeth are ground on their front faces to helicoids which are the same as the helicoids of the initial cutting faces the effective contour will remain the same.

Taking up now the method of making the improved hob, it will be understood that the preliminary steps of turning the blank, cutting the grooves therein, etc., can be carried on in any usual or preferred way, these not of themselves constituting any part of the present invention. The invention relates particularly to the method of shaping the blank to provide a series of distorted elemental contours which will cut a correct composite thread contour.

Inasmuch as the method is in part similar to that presented in my said application Serial No. 274,530, I will herein make the description as brief as possible, reference being had to the said application for a more extended description.

In my said application Serial No. 274,530, I have described a method of making a hob by means of a milling cutter having a distorted effective contour. For extremely accurate work there are difficulties incident to the use of a milling cutter for finally shaping the hob, one of these difficulties being that a certain correction is required in the making of the milling cutter. In accordance with the present invention, these difficulties are avoided by finally shaping the contour of the hob by means of either one or two lathe tools.

A single lathe tool X adapted for the purpose is shown in Figs. 8 and 9. This lathe tool has a distorted shape which adapts it to cut the required distorted shape of a section of the hob, as indicated by dotted lines in Fig. 7. This shape of the tool X may, however, be conveniently formed by means of a preliminary milling cutter, such as S, shown in Figs. 10 and 11. This cutter S is shown diagrammatically in Figs. 12 to 14. This preliminary cutter S is provided with longitudinal teeth 21 having grooves 22 between them, the teeth and grooves being parallel with the axis. The teeth 21 have cutting faces 23 conforming to planes intersecting the axis. Preferably the cutter S has exactly the same number of teeth as the hob A. Figs. 12 and 13 show the preliminary cutter S diagrammatically, there being a smaller number of teeth and the inclination of the cutting faces and the relief being increased.

The cutter S has at any axial planes of intersection such as 14—14 a shape which is the same or approximately the same as the predetermined thread contour as shown by dotted lines in Fig. 14. The shape has points $4^s$, $5^s$, $6^s$, $6^s$, $5^s$ and $4^s$ corresponding respectively to the points 4, 5, 6, 6, 5, 4 on the effective contour of the hob A. The front cutting faces 23 of the teeth are beveled by grinding or otherwise to form helicoidal surfaces in accordance with one step of my novel method.

Each cutting face of the preliminary cutter S, after being ground or otherwise beveled, is helicoidal and preferably has a degree of inclination which is the same as that of the cutting faces of the hob A. When this is the case, as shown, the helix for the preliminary cutter S, along which travels the generatrix of the helicoid, has the same longitudinal pitch as has the corresponding helix for the hob A. The preliminary cutter is preferably much smaller in diameter than the hob and when this is the case, as shown in the drawings, there is an apparent difference in the helicoidal surfaces. While the helicoids are in reality the same, being determined by the same or similar directrices, the actual angle of inclination is less for the preliminary cutter S than for the hob A because of the smaller diameter. It is important that the direction of inclination of the cutting faces be the same for the preliminary cutter as for the hob. If the hob is to have left-hand helicoids as shown the preliminary cutter must also have left-hand helicoids; or if the hob is to have right-hand helicoids the preliminary cutter must have right-hand helicoids.

Each tooth of the preliminary cutter has a degree of relief which is preferably the same as that of the hob. The decrease in radius for each angular increment of advance of the cutter S is the same as the decrease in radius for each angular increment of advance of the hob A. While the degrees of relief are the same, there is an apparent difference because of the smaller diameter of the cutter S.

As the result of the intersection of the helicoidal cutting face of each tooth of the cutter S with the spiral relief lines thereof, the outline or contour of the cutting face is distorted, as shown by full lines in Fig. 14. This distorted contour has points $14^s$, $15^s$, $16^s$, $16^s$, $15^s$ and $14^s$, all points $15^s$, $16^s$, $16^s$, $15^s$, and $14^s$ to the right of the point $4^s$ or $14^s$ being spaced outward from the respectively corresponding points $5^s$, $6^s$, $6^s$, $5^s$, and $4^s$ by progressively increasing distances. Inasmuch as the teeth of the preliminary cutter S are provided with helicoidal cutting faces having the same pitch as the helicoidal cutting faces of the teeth of the hob A and are provided with the same degree of relief as the teeth of the hob A the distortion of the outline $14^s$, $15^s$, $16^s$, $16^s$, $15^s$, $14^s$ is exactly the reverse of the desired distortion of the outlines 14, 15, 16, 16, 15, 14 of the hob, as shown in Fig. 7, the two distortions being the same in extent. The actual inclination of each cutting face of the cutter S is less by reason of the smaller diameter but the amount of relief is more for the same reason, and these differences exactly compensate for each other. The cutter S is used to mill an intermediate tool W providing the said tool at its cutting face 24 with a distorted contour which is the same as the effective contour of the cutter S. This distorted contour is illustrated in the plan view in Fig. 16, the contour having points $14^w$, $15^w$, $16^w$, $16^w$, $15^w$ and $14^w$ corresponding respectively to the points $14^s$, $15^s$, $16^s$, $16^s$, $15^s$ and $14^s$ of the effective contour of the cutter S. It will be observed that the tool W is formed without relief, it being fed perpendicularly to its cutting face 24, as indicated by the arrow in Fig. 15.

The intermediate tool W is used, as shown in Fig. 17, for cutting a lathe tool X. The tool X has a cutting face 25 and has its front face 26 inclined with respect to the cutting face to provide the necessary relief. The tool W is set with its cutting face 24 parallel with the cutting face 25 of the tool X, and relative reciprocation is then effected along lines parallel with the front face 26. The result is that the cutting face 25 is formed with a distorted contour which is exactly the same as the distorted contour of the face 24 of the tool W. This distorted contour is shown in Fig. 18 and it has points $14^x$, $15^x$, $16^x$, $16^x$, $15^x$ and $14^x$ corresponding respectively to the points $14^w$, $15^w$, $16^w$, $16^w$, $15^w$ and $14^w$ of the cutter W.

The tool X, constructed as described, has a distorted shape which is exactly correct for cutting a single section of the hob. I do not, however, limit myself to the method which has been described for forming the distorted shape of the tool. The required distortion having been once determined, by the method described or by computation or otherwise, the tool can, if preferred, be made by other methods without departing from the spirit of the present invention.

While it is possible to use the tool X for the entire operation of cutting the hob, it is usually preferable to effect a roughing out of the hob by means of a milling cutter. For this purpose the same or a similar cutter S may be used.

Figs. 19 and 20 show the cutter S being used for shaping a blank to form a section of the hob A. It will be understood that the cutter S is rapidly rotating in the direction indicated by the arrow thereon; that the blank is slowly rotating in the direction indicated by the arrow thereon; and that relieving is effected preferably by moving the preliminary cutter bodily toward the axis of the blank, as indicated by the vertical arrow, and then bodily away from the axis of the blank in the opposite direction. The downward or inward relieving movement is so timed that the resulting relief on the blank will conform to spirals of Archimedes. The cutter S is moved slowly downward during the cutting of each tooth and then is rapidly moved upward between the teeth to position it for the cutting of the next tooth. The preliminary cutter is made with as small a diameter as possible in order to permit it to follow the relief of one tooth without interfering with or cutting into the outline of the next tooth.

Fig. 19 shows the cut being started, the preliminary cutter S being so adjusted that the point $14^s$ on the teeth of the rotating cutter will engage the initial point 4 of the first tooth of the hob blank A. This action is continued till the relative position shown in Fig. 20 is reached. In this milling action the distorted shape of the cutter S causes the desired distortion in the shape of the hob section. The cutter S shapes the hob section with the several points 4, 5, 6, 6, 5 and 4 all at the proper distances from the axis, so that the section when used will generate the true predetermined contour, as shown by full lines in Fig. 7.

Figs. 21 and 22 are fragmentary front and end views respectively of a hob blank in which one circumferential groove has been milled. The cutter S is shown in operative relation with the hob blank, being at the side thereof instead of at the top thereof as in Figs. 19 and 20. The cutter serves to cut one of the elemental contours on the blank, that is, it serves to cut the circumferential grooves of one set, the operation being the same as that shown in Figs. 19 and 20. As shown, the cutter S is in its outer operative position and is about to move inward to cut the relief on the tooth which has just come into engagement with it.

When the circumferential grooves of one set have been cut, relative longitudinal movement must be effected to position the cutter to cut the grooves of the next set at the proper distance from the first grooves, this distance being exactly equal to the longitudinal pitch of the threads to be milled by the hob. This relative movement can be effected by temporarily withdrawing the cutter, moving it endwise and then restoring it to operative position. Fig. 23 shows the cutter thus moved.

I have stated that the cutter S is reciprocated in timed relation with the rotation of the hob blank. This relation is definite while the cutter is cutting the grooves of any given set, but when the cutter is moved endwise into position to cut the grooves of another set the relationship must be varied in accordance with the changing angular positions of the outer edges of the cutting faces. Fig. 23 shows the hob blank with the engaged tooth in the same position as in Fig. 21, but on account of the inclination of the cutting face 3 the said face is too far advanced with respect to the cutter and is not in the proper position for the starting of the cut. If the same relationship had been maintained between the rotation of the hob blank and the reciprocation of the cutter, the cutter would be in the same outermost operative position which it occupied in Figs. 21 and 22, thus leaving it out of engagement with correct relief lines of the blank. Obviously, the relationship between the cutter and the blank must be varied in order to enable the cutter to cut the necessary relief and at the same time maintain the correct thread contour. Not only must the elemental contour for each section be correct but the contours for the several sections must be properly related so as to provide a correct composite contour. For each section of the hob the required variation in the relationship may be effected by relatively advancing the cutter reciprocation in proportion to the movement of the cutter along the blank from one position to the next, or it may be effected by relatively retarding the rotative movement of the blank in proportion to the cutter movement. In either case the result is to maintain the cutter and the blank in the proper relationship as the cutter is moved longitudinally, and the relative timing is so varied that the cutter always engages the front edge of the tooth when the cutter is in the outer operative position, as shown in Fig. 24. In this figure the blank is shown in the same position as in Fig. 22, but the cutter has been moved inward to properly engage the blank. As the blank rotates the cutter follows the correct lines of relief.

The hob when milled as illustrated in Figs. 19 to 24, is approximately correct and is in fact sufficiently accurate to permit it to be used for many classes of work, even without any correction having been made in the preliminary cutter, as described in my aforesaid application Serial No. 274,530. However, in accordance with the present invention, to insure increased accuracy, the hob is finally cut by means of the lathe tool X, constructed as already described. Fig. 25 is similar to Fig. 22 except that the lathe tool X is shown in place of the milling cutter S. The operation involving the use of the lathe tool is similar to that described in connection with the milling cutter and shown in Figs. 21 to 24. Repetition of the detailed description is unnecessary. Inasmuch as the tool X has a shape which is exactly the same as the distorted shape of a single section of the hob, the result is that the hob is formed with exactly the correct contour at its cutting faces.

Hobs embodying the invention may be used for milling taps and when the hobs are intended for this purpose there are certain peculiar factors to be taken into account in the making of the hobs. The taps must be hardened after milling and as the result of the hardening process the length of the taps is changed, usually being decreased. To compensate for this, the longitudinal pitch of the thread contours on the hob must be slightly varied, usually being increased. A common amount of increase is .002" per inch but this varies with the character of the steel of which the taps are made and with the process which is used for hardening. Obviously, the cutter or tool which is used to cut the hob must have its width increased in proportion to the desired increase in longitudinal pitch of the hob. This increase for a single thread contour is very small, and in fact is frequently so small as to be incapable of measurement by ordinary methods. For instance, if the increase in the pitch is .002" per inch, as stated, and if there are eight threads per inch, it will be seen that the added width for the cutter or tool is $\frac{1}{16}$th part of .002" or $\frac{1}{8}$th of .001". This provides for the distribution of the increase over both the threads and the grooves.

If a milling cutter such as S is to be finally relied upon, this cutter must be corrected by having its width increased by $\frac{1}{8}$th of .001". To do this it is necessary to increase the width of the tool which is used for making the preliminary cutter. It is difficult to make such a correction with exactitude and it frequently happens that after an attempted correction has been made it is found to be erroneous, thus necessitating the making of an entire new cutter S. Furthermore, there are difficulties arising from the possible warping of the cutter S in hardening.

The difficulties are almost equally great when a tool such as X is used for cutting the hob, as illustrated in Fig. 25. It is not easy to correct the tool X by direct methods partly because of the difficulty in keeping the corners sharp at 5, 5 and partly because of the difficulty in keeping the depth $d$ correct.

Even after the corrections have been properly made for a predetermined excess pitch, it may happen that hobs are required for acting on a different grade of steel requiring a slightly different excess pitch. This necessitates further correction of the milling cutter or tool which is to be used. If the excess pitch is to be .003" instead of .002", and if the number of threads is eight as before, then $\frac{1}{16}$th of .001" must be further added to the preliminary cutter or tool. It is obvious that the difficulties of making these minute corrections or changes in the preliminary cutter S or in the lathe tool X are very great.

To avoid these difficulties I prefer for very accurate work (particularly for making hobs which are to be used for milling taps for U. S. standard threads) to make use of tools such as Y and Z, shown in Figs. 26 to 29. The tool Y has a contour $15^y$, $16^y$, $16^y$, $15^y$ which is the same as the corresponding part of the contour of the tool X. The tool Y may be made by means of the cutter S or otherwise as preferred. This tool is used as illustrated in Fig. 30 to cut the sides and bottoms of the circumferential grooves in the hob. The method involving the use of the tool Y is the same as that described in connection with the tool X, and repetition is unnecessary. By means of a suitable grinding fixture, the tool Y may be readily modified to effect minor variations in the contour $15^y, 16^y, 16^y, 15^y$. If increased width is desired, this can be effected by grinding off a small amount from the flat $16^y$—$16^y$. If decreased width is desired, one of the sides $15^y$—$16^y$ can be ground off. It will be understood that in any such grinding of the flat 16ʸ—16ʸ or of a side 15ʸ—16ʸ, the angles are kept unchanged. It will be seen that the tool Y can be used for cutting a test piece, and that if any error is found the error can be readily corrected by changing the tool.

The tool Z is used for cutting the tops 4, 5, 4 of the tongues. The angle of the front cutting edge of the tool is the same as that of the parts 4, 5 of the tool X, this angle being also the same as the angle of the parts 16ˣ—16ˣ and 16ʸ—16ʸ of the tools X and Y respectively.

Fig. 31 shows the tool Z in use, the operation being the same as for the tool Y and for the tool X. It is obvious that care must be taken to so set the tool Z as to provide the correct contour depth $d$. The cutting of the thread contour by the tools Y and Z is illustrated as taking place in two distinct successive operations, but it will be understood that the invention is not limited in this respect, as the tools may be used simultaneously.

In my copending application for relieving machines, Serial No. 201,338 filed November 10th, 1917, I have presented a machine well adapted for the carrying out of the method. But so far as the method is concerned the machine may be widely varied, and in Figs. 32 and 33 I have illustrated diagrammatically the essential parts of a very simple machine which might be used. As illustrated, 27 is a mandrel upon which is carried a hob blank A. Suitable means are provided for supporting and rotating the mandrel. Longitudinally movable along ways 28, 28 is a carriage 29 carrying a transversely movable slide 30 upon which is mounted a lathe tool X, Y or Z. I have shown a tool Y mounted on the slide but it will be understood that a tool X or Z may be substituted. Preferably there is an intermediate slide 32 by means of which preliminary adjustments may be effected.

A cam 33 is splined to a shaft 34 which is rotatably mounted on the carriage 29. The cam 33 has as many lobes as the cutter A has teeth. When the slide 30 moves longitudinally with the carriage 29 the cam 33 moves along the shaft, the shaft itself being fixed against longitudinal movement. A finger 35 secured to the slide 30 engages the cam and a spring 36 is provided for pressing the slide 30 outward, thus holding the finger 35 against the cam. Suitable means, not fully shown, are provided for rotating the shaft 34 in timed relation with the mandrel 27, the shaft being given one complete rotation for each complete revolution of the mandrel and of the blank A. The groove or keyway 37 of the shaft 34 is helical in form and has the same degree of inclination as the teeth of the blank A. The result is that when the tool Y is moved longitudinally of the blank from one position to the next the cam 33 is moved along the shaft 34. On account of the helical keyway the cam not only partakes of the normal rotative movement of the shaft but is given a supplemental rotative movement, this supplemental movement being exactly correct in amount to cause the tool, when in its outermost operative position to each reciprocation, to engage the front edge of a tooth of the hob.

In operation a blank A is put in place as shown, this blank having previously been roughed out and longitudinally grooved in any usual or preferred way. By means of the slide 32 the tool Y is adjusted into engagement with the blank at its right-hand end and the movement of the machine is started. The blank A rotates and the tool Y is given a reciprocating movement to effect the relief. This is continued until the blank has made a complete revolution, thus effecting the cutting of one set of grooves. Then the carriage 29 is moved along the ways 28, 28 a distance equal to the required pitch, the tool being in the meantime withdrawn, if necessary, by moving the slide 32 relatively to the slide 30. Inasmuch as the cam 33 moves longitudinally along the shaft 34 when the carriage and the cutter are moved, the reciprocating and relieving movements of the cutter are slightly advanced, thus causing the tool to engage the blank at the proper times, notwithstanding the changed positions of the cutting faces as the result of the inclination thereof.

After the operation with the tool Y is completed it is taken out and a tool Z substituted. The tool Z is adjusted as indicated in Fig. 31 and then the foregoing operation of the machine is repeated.

What I claim is:

1. The herein described method of shaping a relieved milling cutter having helicoidal cutting faces adapted to cut a predetermined composite contour consisting of a number of equal elemental contours arranged at uniform distances, the method consisting in axially rotating a blank having teeth with helicoidal cutting faces, in providing and positioning a non-rotary lathe tool having a distorted shape whereby it is adapted to correctly cut one of the said elemental contours, in moving the tool toward and from the blank axis during the cutting action in timed relation to the blank rotation to effect relieving, in moving the tool longitudinally of the blank after the cutting action to position it for cutting another of the said elemental contours, in varying the timed relation of the relieving movements in proportion to the said longitudinal movement and in accordance with the inclination of the helicoidal cutting faces, and in repeating the said series of tool movements until the final milling cutter has been shaped with the required number of elemental contours.

2. The herein described method of shaping a relieved hob for milling threads of a predetermined standard contour and having helicoidal cutting faces, the method consisting in axially rotating a blank having teeth with helicoidal cutting faces, in providing and positioning a non-rotary lathe tool having a distorted shape whereby it is adapted to correctly cut a single thread contour, in moving the tool toward and from the blank axis during the cutting action in timed relation to the blank rotation to effect relieving, in moving the tool longitudinally of the blank after the cutting action through the pitch distance between two threads to position it for cutting another thread contour, in varying the timed relation of the relieving movements in proportion to the said longitudinal movement and in accordance with the inclination of the helicoidal cutting faces, and in repeating the said series of tool movements until the hob has been shaped with the required number of thread contours.

3. The herein described method of shaping a relieved hob for milling threads of a predetermined standard contour and having helicoidal cutting faces, the method consisting in axially rotating a blank having teeth with helicoidal cutting faces, in forming a preliminary milling cutter having at axial planes of intersection a shape the same or approximately the same as a single thread contour and having its teeth provided with helicoidal cutting faces with the same degree of inclination as the cutting faces of the hob and provided with the same degree of relief as the teeth of the hob, in positioning the preliminary cutter in operative relation to the blank to cut a single thread contour, in moving the cutter toward and from the blank axis during the cutting action in timed relation to the blank rotation to effect relieving, in moving the cutter longitudinally of the blank after the cutter action through the pitch distance between two threads to position it for cutting another thread contour, in changing the timed relation of the relieving movement in proportion with the said longitudinal movement and in accordance with the inclination of the helicoidal cutting faces, in repeating the said series of cutter movements until the hob has been shaped with the required number of thread contours, in providing a lathe tool having a distorted shape whereby it is adapted to cut one of the said thread contours, and in repeating with the lathe tool the before described movements in relation to the blank.

4. The herein described method of shaping a relieved hob for milling threads of a predetermined standard contour and having helicoidal cutting faces, the method consisting in axially rotating a blank having teeth with helicoidal cutting faces, in forming a preliminary milling cutter having at axial planes of intersection a shape the same or approximately the same as a single thread contour and having its teeth provided with helicoidal cutting faces with the same degree of inclination as the cutting faces of the hob and provided with the same degree of relief as the teeth of the hob, in forming a lathe tool by means of the said preliminary milling cutter to give the said tool a distorted shape whereby it is adapted to cut one of the said thread contours, in positioning the tool in cutting relation to the blank, in moving the tool toward and from the blank axis during the cutting action in timed relation to the blank rotation to effect relieving, in moving the tool longitudinally of the blank after the cutting action through the pitch distance between two threads to position it for cutting another thread contour, in varying the timed relation of the relieving movements in proportion to the said longitudinal movement and in accordance with the inclination of the helicoidal cutting faces and in repeating the said series of tool movements until the hob has been shaped with the required number of thread contours.

5. The herein described method of shaping a relieved hob for milling threads of a predetermined standard contour and having helicoidal cutting faces, the method consisting in axially rotating a blank having teeth with helicoidal cutting faces, in forming a preliminary milling cutter having at axial planes of intersection a shape the same or approximately the same as a single thread contour and having its teeth provided with helicoidal cutting faces with the same degree of inclination as the cutting faces of the hob and provided with the same degree of relief as the teeth of the hob, in positioning the preliminary cutter in operative relation to the blank to cut a single thread contour, in moving the cutter toward and from the blank axis during the cutting action in timed relation to the blank rotation to effect relieving, in moving the cutter longitudinally of the blank after the cutter action through the pitch distance between two threads to position it for cutting another thread contour, in changing the timed relation of the relieving movement in proportion with the said longitudinal movement and in accordance with the inclination of the helicoidal cutting faces, in repeating the said series of cutter movements until the hob has been shaped with the required number of thread contours, in providing a lathe tool, in forming the lathe tool by means of the said preliminary milling cutter to give the said tool a distorted shape whereby it is adapted to cut one of the said thread contours, and in repeating with the lathe tool the before described movements in relation to the blank.

6. The herein described method of shaping a relieved hob for milling threads of a predetermined standard contour and having helicoidal cutting faces, the method consisting in axially rotating a blank having teeth with helicoidal cutting faces, in providing and positioning a non-rotary lathe tool having a distorted shape whereby it is adapted to correctly cut the sides and bottom of a single thread contour, in moving the tool toward and from the blank axis during the cutting action in timed relation to the blank rotation to effect relieving, in moving the tool longitudinally of the blank after the cutting action through the pitch distance between two threads to position it for cutting another thread contour, in varying the timed relation of the relieving movements in proportion to the said longitudinal movement and in accordance with the inclination of the helicoidal cutting faces, in repeating the said series of tool movements until the hob has been shaped with the required number of partial thread contours, in providing and positioning a second non-rotary lathe tool having an inclined cutting edge whereby it is adapted to correctly cut the top of a single thread contour, and in repeating with the second lathe tool the before described movements in relation to the blank.

7. The herein described method of shaping a relieved hob for milling threads of a predetermined standard contour and having helicoidal cutting faces, the method consisting in axially rotating a blank having teeth with helicoidal cutting faces, in forming a preliminary milling cutter having at axial planes of intersection a shape the same or approximately the same as a single thread contour and having its teeth provided with helicoidal cutting faces with the same degree of inclination as the cutting faces of the hob and provided with the same degree of relief as the teeth of the hob, in positioning the preliminary cutter in operative relation to the blank to cut a single thread contour, in moving the cutter toward and from the blank axis during the cutting action in timed relation to the blank rotation to effect relieving, in moving the cutter longitudinally of the blank after the cutter action through the pitch distance between two threads to position it for cutting another thread contour, in changing the timed relation of the relieving movement in proportion with the said longitudinal movement and in accordance with the inclination of the helicoidal cutting faces, in repeating the said series of cutter movements until the hob has been shaped with the required number of thread contours, in providing and positioning a non-rotary lathe tool having a distorted shape whereby it is adapted to correctly cut the sides and bottom of a single thread contour, in repeating with the lathe tool the before described movements in relation to the blank, in providing and positioning a second non-rotary lathe tool having an inclined cutting edge whereby it is adapted to correctly cut the top of a single thread contour, and in again repeating with the second lathe tool the before described movements in relation to the blank.

In testimony whereof I hereto affix my signature.

FRIEDERICH MÜLLER.

It is hereby certified that in Letters Patent No. 1,348,306, granted August 3, 1920, upon the application of Friederich Müller, of Hartford, Connecticut, for an improvement in "Methods of Making Thread-Milling Hobs," errors appear in the printed specification requiring correction as follows: Page 1, line 34, for the word "for" read *with;* page 3, line 23, after the word "on" insert the word *an;* and that the said Letters Patent should be read with these corrections therein that the same may conform to the record of the case in the Patent Office.

Signed and sealed this 28th day of September A. D., 1920.

[SEAL.]

M. H. COULSTON,
*Acting Commissioner of Patents.*

Cl. 76—101.